(12) United States Patent
Chang et al.

(10) Patent No.: US 9,983,844 B2
(45) Date of Patent: May 29, 2018

(54) VIRTUAL CONTENT MANAGEMENT

(71) Applicant: International Business Machines Corporation, Armonk, NY (US)

(72) Inventors: Hsinchi Chang, Taipei (TW); Ping-Hung Lai, Taipei (TW); Yin-Duen Liao, Taipei (TW); Cheng-Yu Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/043,840

(22) Filed: Feb. 15, 2016

(65) Prior Publication Data

US 2017/0235536 A1   Aug. 17, 2017

(51) Int. Cl.
*G06F 3/00* (2006.01)
*G06F 3/14* (2006.01)
*G06F 3/0484* (2013.01)
*H04L 29/08* (2006.01)
*G06F 17/24* (2006.01)
*G06F 3/0482* (2013.01)
(Continued)

(52) U.S. Cl.
CPC .......... *G06F 3/1454* (2013.01); *G06F 3/017* (2013.01); *G06F 3/0482* (2013.01); *G06F 3/04845* (2013.01); *G06F 17/248* (2013.01); *H04L 63/083* (2013.01); *H04L 67/18* (2013.01); *G06F 2203/04804* (2013.01); *H04L 67/38* (2013.01)

(58) Field of Classification Search
CPC ...................................... G06F 3/017
USPC ........................................ 715/753
See application file for complete search history.

(56) References Cited

U.S. PATENT DOCUMENTS 8,244,233 B2    8/2012  Chang et al.
9,326,019 B2 *  4/2016  Rydenhag ............. G06Q 30/02
9,729,695 B2 *  8/2017  Seo ................... H04M 1/72552
(Continued)

FOREIGN PATENT DOCUMENTS

CN        202771397 U    3/2013

OTHER PUBLICATIONS

Lech et al., "Gesture-based Computer Control System applied to the Interactive Whiteboard", Proceedings of the 2nd International Conference on Information Technology (ICIT), Jun. 28-30, 2010, Gdansk, Poland, pp. 75-78.

(Continued)

*Primary Examiner* — William Titcomb
(74) *Attorney, Agent, or Firm* — Tihon Poltavets

(57) ABSTRACT

A method includes receiving a first virtual board selection from a first user, wherein a first virtual board allows for one or more users to create one or more virtual posts during a current collaboration event. The method displays the first virtual board and a first set of previously created virtual posts in the first virtual board, wherein the first set of previously created virtual posts is associated with a previous collaboration event. The method displays two or more templates for creating a new virtual post. The method receives content to populate the first template, wherein the populated first template represents a first virtual post of a second set of virtual posts for the current collaboration event. The method displays the first virtual post on the first virtual board based on a first position of an electronic device associated with the first user relative to the first virtual board.

20 Claims, 6 Drawing Sheets

(51) Int. Cl.
*G06F 3/01* (2006.01)
*H04L 29/06* (2006.01)

(56) References Cited

U.S. PATENT DOCUMENTS

| | | | |
|---|---|---|---|
| 2009/0083627 A1* | 3/2009 | Onda | G06F 3/04815 715/708 |
| 2012/0170800 A1* | 7/2012 | da Silva Frazao | G06F 3/011 382/103 |
| 2013/0047093 A1 | 2/2013 | Reuschel et al. | |
| 2013/0050260 A1* | 2/2013 | Reitan | G06F 3/011 345/633 |
| 2013/0263280 A1* | 10/2013 | Cote | G06F 21/62 726/26 |
| 2014/0026076 A1 | 1/2014 | Jacob et al. | |
| 2014/0053086 A1* | 2/2014 | Kim | H04L 65/403 715/753 |
| 2014/0063061 A1* | 3/2014 | Reitan | G09G 3/003 345/633 |
| 2014/0143683 A1* | 5/2014 | Underwood, IV | H04L 51/38 715/752 |
| 2014/0164984 A1 | 6/2014 | Farouki | |
| 2014/0223334 A1 | 8/2014 | Jensen et al. | |
| 2014/0297646 A1 | 10/2014 | Bastiaens et al. | |
| 2015/0067058 A1* | 3/2015 | Vellozo Luz | G06Q 10/103 709/204 |

OTHER PUBLICATIONS

Sodhi et al., "BeThere: 3D Mobile Collaboration with Spatial Input", CHI 2013: Changing Perspectives, Apr. 27-May 2, 2013, Paris, France, Copyright © 2013 ACM, pp. 179-188.

"BrightLink® Pro—Collaborative Meeting Room Solutions", Epson America, Inc., WaybackMachine Sep. 28, 2015 . Copyright 2000-2016 Epson America Inc. <http://www.epson.com/cgi-bin/Store/jsp/Landing/brightlink-pro-collaborative-whiteboarding-solution.do?ref=van_blpro#lightbox/1/>.

"Padlet is the easiest way to create and collaborate in the world", WaybackMachine, Jul. 6, 2015. <https://padlet.com/>.

"System and Method for Sharing Whiteboard Information during Virtual Meetings", An IP.com Prior Art Database Technical Disclosure, Disclosed Anonymously, IP.com No. 000241207, Publication Date: Apr 3, 2015. <https://priorart.ip.com/IPCOM/000241207>.

"Use from smartphones—new-lino", WaybackMachines Aug. 7, 2015. Copyright 2015 Infoteria Corporation. <http://en.linoit.com/en/tour/iphone-and-ipad/>.

* cited by examiner

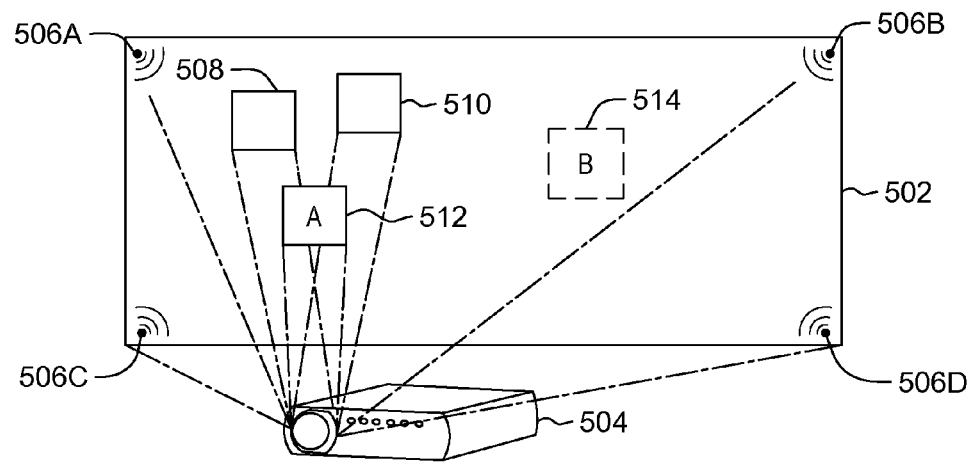
FIG. 5A
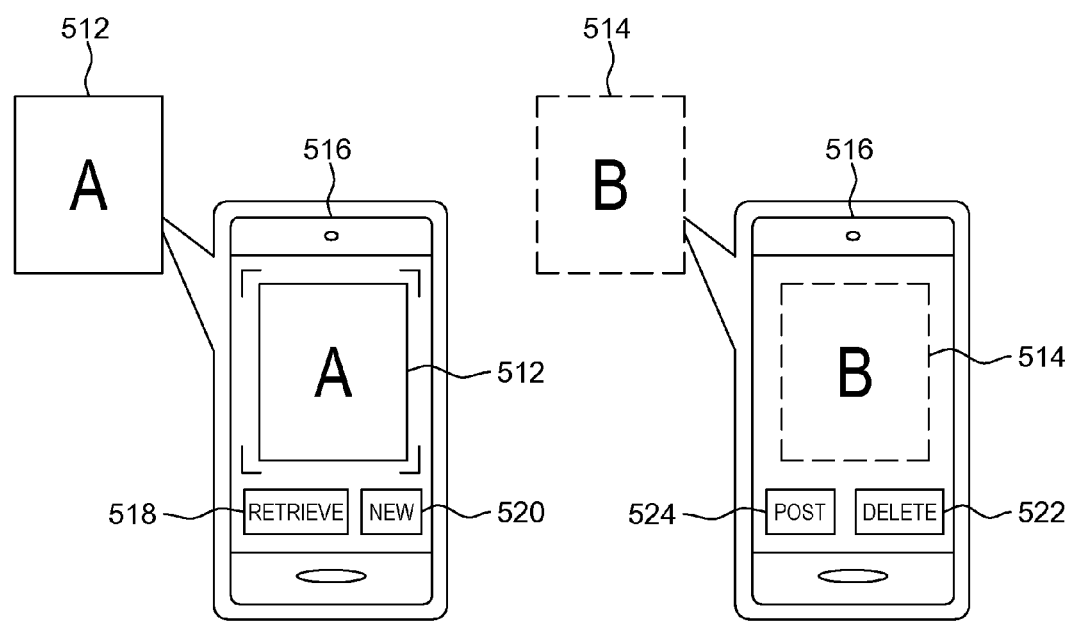
FIG. 5B
FIG. 5C

VIRTUAL CONTENT MANAGEMENT

BACKGROUND

The present invention relates generally to virtual content and more particularly to managing virtual content during a collaborative event.

Traditional collaborative events, such as a meeting of company employees, typically occur in a conference room. Traditional collaborative events allow for tools to be readily available to the participating employees to record information generated during a particular event. However, traditional collaborative events are becoming less common compared to collaborative events that can occur in less traditional locations ranging from a hotel conference room to a local coffee shop. A first session of a collaborative event can begin in the conference room between three employees and then move to a local coffee shop for a second session, where another two employees join the collaborative event.

SUMMARY

Embodiments of the present invention include a method, computer program product and computer system for managing virtual content during a collaborative event. A computer-implemented method includes receiving, by one or more processors, a first virtual board selection from a first user, wherein a first virtual board allows for one or more users to create one or more virtual posts during a current collaboration event; displaying, by one or more processors, the first virtual board and a first set of previously created virtual posts in the first virtual board, wherein the first set of previously created virtual posts are associated with a previous collaboration event; displaying, by one or more processors, two or more templates for creating a new virtual post; responsive to receiving a first template selection for creating the new virtual post, receiving, by one or more processors, content to populate the first template, wherein the populated first template represents a first virtual post of a second set of virtual posts for the current collaboration event; and displaying, by one or more processors, the first virtual post on the first virtual board based on a first position of an electronic device associated with the first user relative to the first virtual board.

BRIEF DESCRIPTION OF THE DRAWINGS

FIG. 5A illustrates an example scenario for displaying a virtual board populated with virtual posts, in accordance with the present invention.

FIG. 5B illustrates an example scenario for retrieving or creating a virtual post on the virtual board from FIG. 5A, in accordance with the present invention.

FIG. 5C illustrates an example scenario for posting or deleting a virtual post on the virtual board from FIG. 5A, in accordance with the present invention.

DETAILED DESCRIPTION

Figure 1:
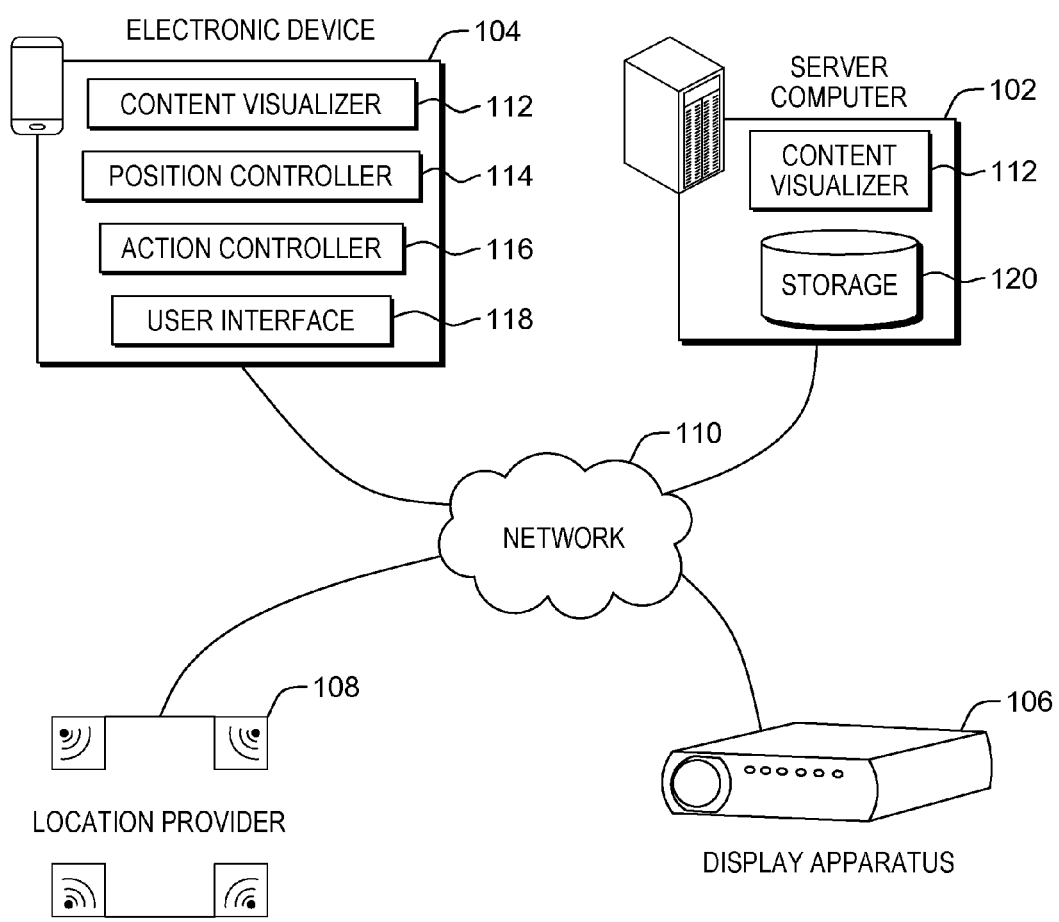
FIG. 1 is a functional block diagram illustrating a distributed data processing environment, in an embodiment in accordance with the present invention.

Example embodiments in accordance with the present invention will now be described in detail with reference to the Figures. FIG. 1 is a functional block diagram illustrating a distributed data processing environment. The distributed data processing environment includes server computer 102, electronic device 104, display apparatus 106, and location provider 108 interconnected over network 110.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 includes content visualizer 112 and storage 120 accessible by electronic device 104 and any other electronic devices not illustrated in FIG. 1, via network 110.

Electronic device 104 may be a laptop computer, tablet computer, netbook computer, personal computer (PC), personal digital assistant (PDA), smart phone, wearable device (e.g., smart watch, personal fitness device, personal safety device), or any programmable computer system known in the art with an interactive display. Electronic device 104 includes content visualizer 112, position controller 114, action controller, 116, and user interface 118. In general, electronic device 104 is representative of any programmable electronic device or combination of programmable electronic devices capable of executing machine-readable program instructions and communicating with users of other electronic devices via network 110. Electronic device 104 may include components, as depicted and described in further detail with respect to FIG. 6, in accordance with embodiments of the present invention.

Display apparatus 106 may be a television, a laptop computer, a tablet computer, a netbook computer, a personal computer, a projector, or any programmable electronic device known in the art capable of rendering content to a user. Display apparatus 106 is capable of rendering (i.e., displaying) a virtual board and populating the virtual board with virtual posts based on information received from content visualizer 112. A virtual board type can include a pin board, a whiteboard, a blackboard, or any type of display utilized for sharing content during collaborative events. A virtual post type can include an index card, loose-leaf page, sticky note, or any type of item capable of being attached to a display utilized for sharing content during collaborative events. Display apparatus 106 renders a virtual board by mimicking properties of a physical item on which the virtual board is based. For example, display apparatus 106 can project a 4' by 6' white surface with an aluminum style board onto a wall of a hotel room, to represent a physical white board. Display apparatus 106 allows for the rendering of the whiteboard as a virtual board in any location, without the need of having a physical whiteboard present for the collaborative event. Display apparatus 106 has the ability to render virtual posts in layers on the virtual board, similar to how multiple index cards can be attached to a pin board with a single pin. Display apparatus 106 can mimic the layering of virtual posts through the use of shadowing effects, or display apparatus 106 can render the layering of virtual post on a Z-axis relative to the plane surface of the virtual board.

Location provider 108 may be one or more positioning sensors capable of determining a location of electronic device 104 relative to a virtual board being displayed by display apparatus 106. Location provider 108 can determine a location of electronic device 104 utilizing X, Y, and Z position coordinates and send the determined location to content visualizer 112. The X position coordinate represents a longitudinal position of electronic device 104, the Y position coordinate represents a latitudinal position of electronic device 104, and the Z position coordinate represents a depth position of electronic device 104. The depth position of electronic device allows for a user to place virtual post "A" between two stacked virtual posts, "B" and In one example, a virtual board can be represented as a whiteboard that display apparatus 106 renders on a physical surface, where the physical surface is a wall in a hotel conference room. A virtual post can represent a sticky note that display apparatus 106 renders on the virtual board (i.e., whiteboard). Electronic device 104 enables a user to create, retrieve, delete, or display a virtual post on the virtual board by mimicking hand movements similar to the motions performed on a physical whiteboard. For example, if a user of electronic device 104 wants to post a first virtual post (i.e., sticky note) to the virtual board (i.e., white board), the user of electronic device 104 places the top surface of electronic device 104 on the virtual board (Z=0). If the user of electronic device 104 wants to post a second virtual post on top of the first virtual post, the user of electronic device of electronic 104 tilts the top surface of electronic device 104 towards the virtual board at a set distance from the surface of virtual board (Z=1).

Content visualizer 112 can either operate in a client-side based setting, for example on electronic device 104, or content visualizer program 112 can operate in a server-side based setting, for example on server computer 102. Content visualizer 112 has the ability to establish a collaboration event utilizing a virtual board populated with virtual posts. Content visualizer program 112 can receive account information and credentials for authentication and display a list of authorized virtual boards associated with the received account information in user interface 118 on electronic device 104. Content visualizer 112 can receive a virtual board selection, populate the virtual board with virtual posts, and display the virtual board to users taking part in the collaboration event utilizing display apparatus 106.

Content visualizer 112 also has the ability to retrieve or create a virtual post on a virtual board. Content visualizer 112 can retrieve a virtual post from the virtual board by determining that electronic device 104 was place near the virtual board and determining the X, Y, and Z position coordinates for electronic device 104, relative to the virtual board. Content visualizer 112 can determine that a virtual post exists at the X, Y, and Z position coordinates for electronic device and display the virtual post in user interface 118 on electronic device 104. Content visualizer 112 also has the ability to post a new virtual post to the virtual board by displaying templates for creating virtual posts on electronic device 104 and receiving a template selection from the user of electronic device 104. Content visualizer 112 can receive content to populate the selected template, store the populated template as a new virtual post in storage 120 on server computer 102, and display the new virtual post in user interface 118 on electronic device 104.

Content visualizer 112 also has the ability to delete a virtual post from a virtual board. Content visualizer 112 can determine to delete the virtual post from the virtual board via a user input on electronic device 104 and determine if the virtual post is to be deleted from storage 120 on server computer 102. Content visualizer 112 can display the virtual board without the deleted virtual post utilizing display apparatus 106. Content visualizer 112 also has the ability to display a virtual post on the virtual board. Content visualizer 112 can receive a selection to display a virtual post on the virtual board and determine the X, Y, and Z position coordinates for electronic device 104, relative to the virtual board. Content visualizer 112 can store the X, Y, and Z position for the virtual post and display the virtual board with the virtual post at the X, Y, and Z position utilizing display apparatus 106.

Position controller 114 can determine an orientation of electronic device 104 and send the determined orientation of electronic device 104 to content visualizer 112. Content visualizer 112 utilizes information received from position controller 114 to display a virtual post at a particular degree of yaw on a virtual board. For example, 0 degrees can represent content visualizer 112 displaying a virtual post vertically and 90 degrees can represent content visualizer 112 displaying a virtual post horizontally.

Action controller 116 can determine gestures performed by a user of electronic device and send the gesture information to content visualizer 112, where content visualizer 112 can translate the received gesture into an action. For example, action controller 116 determines a rapid back and forth motion and sends the information to content visualizer 112, where content visualizer 112 determines the user of electronic device 104 is attempting to delete a virtual post being displayed in user interface 118.

Electronic device 104 also includes user interface (UI) 118 and various programs (not shown). Examples of the various programs on electronic device 104 include: a web browser, an e-mail client, security software (e.g., a firewall program, a geo-locating program, an encryption program, etc.), an instant messaging (IM) application (app), and a communication (e.g., phone) application. In an example, a user of an electronic device 104 can interact with user interface 118, such as a touch screen (e.g., display) that performs both as an input device to a graphical user interface (GUI) and as an output device (e.g., a display) presenting a plurality of icons associated with software applications or images depicting the executing software application. Optionally, a software application (e.g., a web browser) can generate user interface 118 operating within the GUI of electronic device 104. User interface 118 accepts input from a plurality of input/output (I/O) devices including, but not limited to, a tactile sensor interface (e.g., a touch screen, a touchpad) referred to as a multi-touch display. An I/O device interfacing with user interface 118 may be connected to electronic device 104, which may operate utilizing wired (e.g., USB port) or wireless network communications (e.g., infrared, NFC, etc.).

In general, network 110 can be any combination of connections and protocols that will support communications among server computer 102, electronic device 104, display apparatus 106, and location provider 108. Network 110 can include, for example, a local area network (LAN), a wide area network (WAN), such as the internet, a cellular network, or any combination of the preceding, and can further include wired, wireless, and/or fiber optic connections. In one embodiment, content visualizer 112 can be a web service accessible via network 112 to a user of electronic device 104. In another embodiment, content visualizer 112 may be operated directly by a user of server computer 102.

Storage 120 located on server computer 102, represents any type of storage device capable of storing data that is accessed and utilized by content visualizer 112. In other embodiments, storage 120 represents multiple storage devices within server computer 102. Storage 120 stores information such as, but not limited to, account information, credentials for authentication, virtual board types, virtual boards, virtual post templates, virtual board posts, and location information for collaboration events and virtual posts relative to a virtual board.

Figure 2:
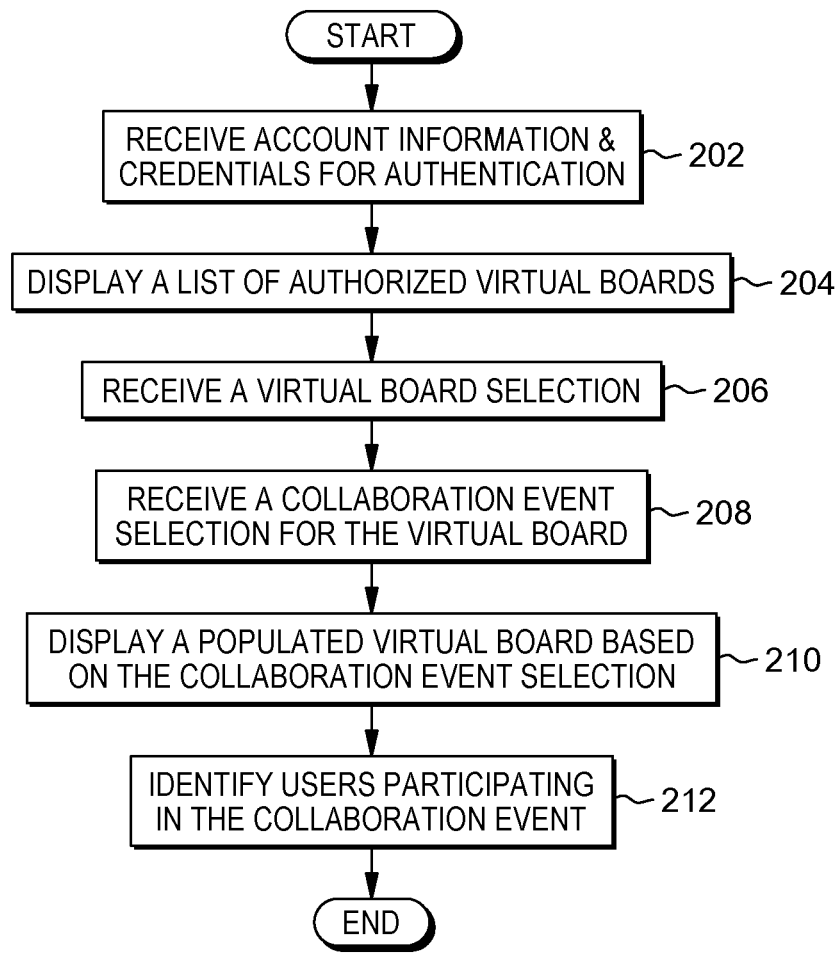
FIG. 2 is a flowchart depicting one embodiment of a content visualizer establishing a collaboration event utilizing a virtual board with virtual posts, in accordance with the present invention.

FIG. 2 is a flowchart depicting one embodiment of a content visualizer establishing a collaboration event utilizing a virtual board with virtual posts, in accordance with the present invention. As depicted, a method includes receiving (202) account information and credentials for authentication, displaying (204) a list of authorized virtual boards, receiving (206) a virtual board selection, receiving (208) a collaboration event selection for the virtual board, displaying (210) a populated virtual board based on the collaboration event selection, and identifying (212) users participating in the collaboration event. In one embodiment, content visualizer 112 performs the above-mentioned steps of the method.

The method may commence by receiving (202) account information and credentials for authentication. In this embodiment, content visualizer 112 receives account information and credential information from electronic device 104, associated with a user hosting a collaboration event between multiple users. Content visualizer 112 receives a user name (i.e., account information) associated with an account, along with a password (i.e., credentials) associated with the account for establishing the collaboration event between multiple users. Content visualizer 112 can receive account information and credentials for the remaining users participating in the collaboration event, subsequent to content visualizer 112 receiving account information and credential information for the host user (user of electronic device 104). Upon authentication of credentials for the received account information, content visualizer 112 provides the host user with various options including but not limited to, establishing a new collaboration event, continuing a previously established collaboration event, and altering account information associated with the hosting user.

The method may continue by displaying (204) a list of authorized virtual boards. In this embodiment, content visualizer 112 displays a list of authorized virtual boards to the user hosting the collaboration event, where the list of authorized virtual boards includes virtual boards from previous collaboration events where the user was either a host or participant of the collaboration event. The list of authorized virtual boards also includes virtual board templates from which content visualizer 112 establishes a new a collaboration event. Virtual board templates provided by content visualizer 112 are accessible to the authorized user for editing according to user preference.

The method may continue by receiving (206) a virtual board selection. In this embodiment, content visualizer 112 receives a virtual board selection from the host user for establishing a new collaboration event. In one example, the virtual board selection represents an empty virtual board mimicking a white board. In another example, the virtual board selection represents a particular template selected from the list of authorized virtual boards available to the hosting user. A particular template can include a virtual board being split into a "Comments Section" and "Program Section" for organizing virtual posts on the virtual board. The "Comment Section" represents a first portion of the virtual board where participants can post comments associated with content present in the "Program Section". The "Program Section" can include content of a program operating on electronic device 104 or content of from a web browser.

The method may continue by receiving (208) a collaboration event selection for the virtual board. In this embodiment, content visualizer 112 receives a collaboration event selection, where the collaboration event selection restores a previously established collaboration event. For example, a previously established collaboration event occurred seven days ago in City I between the host user, user A, and user B. The host user selects to restore the previously established collaboration event while in City II between the host user, user C, and user D. Content visualizer 112 has the ability to identify a location for a particular collaboration event, track which users participate in the particular collaboration event, and store the location and user participant information in the form of a history log for the particular collaboration event. In another embodiment, content visualizer 112 receives a collaboration selection, where a host user is establishing a new collaboration event.

The method may continue by displaying (210) a populated virtual board based on the collaboration event selection. In this embodiment, content visualizer 112 restores a previously established collaboration event and displays previously created virtual posts on the virtual board. In an example, a first set of virtual posts includes comments posted by participating users, where each virtual post from the first set of virtual posts includes a comment and a name of the participant user that created the comment. A second set of virtual posts includes webpages posted by participating user, where content visualizer 112 connects to a webpage for each virtual post from the second set of virtual posts and displays the webpage in the virtual board.

The method may continue by identifying (212) users participating in the collaboration event. Content visualizer 112 can identify users participating in the new collaboration event based on a user name associated with an account for each participating user. In one example, content visualizer 112 generates a unique code for the new collaboration event, where content visualizer 112 identifies each user through an electronic device that enters the unique code. Content visualizer 112 receives the unique code from a participating user and identifies account information associated with the participating user. Based on the identified account information, content visualizer 112 grants the participating user access to the virtual board and stores the newly established collaboration event under the list of authorized virtual boards. Content visualizer 112 can also identify a geographical location for the meeting including but not limited to country, state, zip code, county, city, street, building, floor, and room number. Content visualizer 112 can store the geographic location for the collaboration event and the identified users participating in the collaboration event in a repository.

Figure 3:
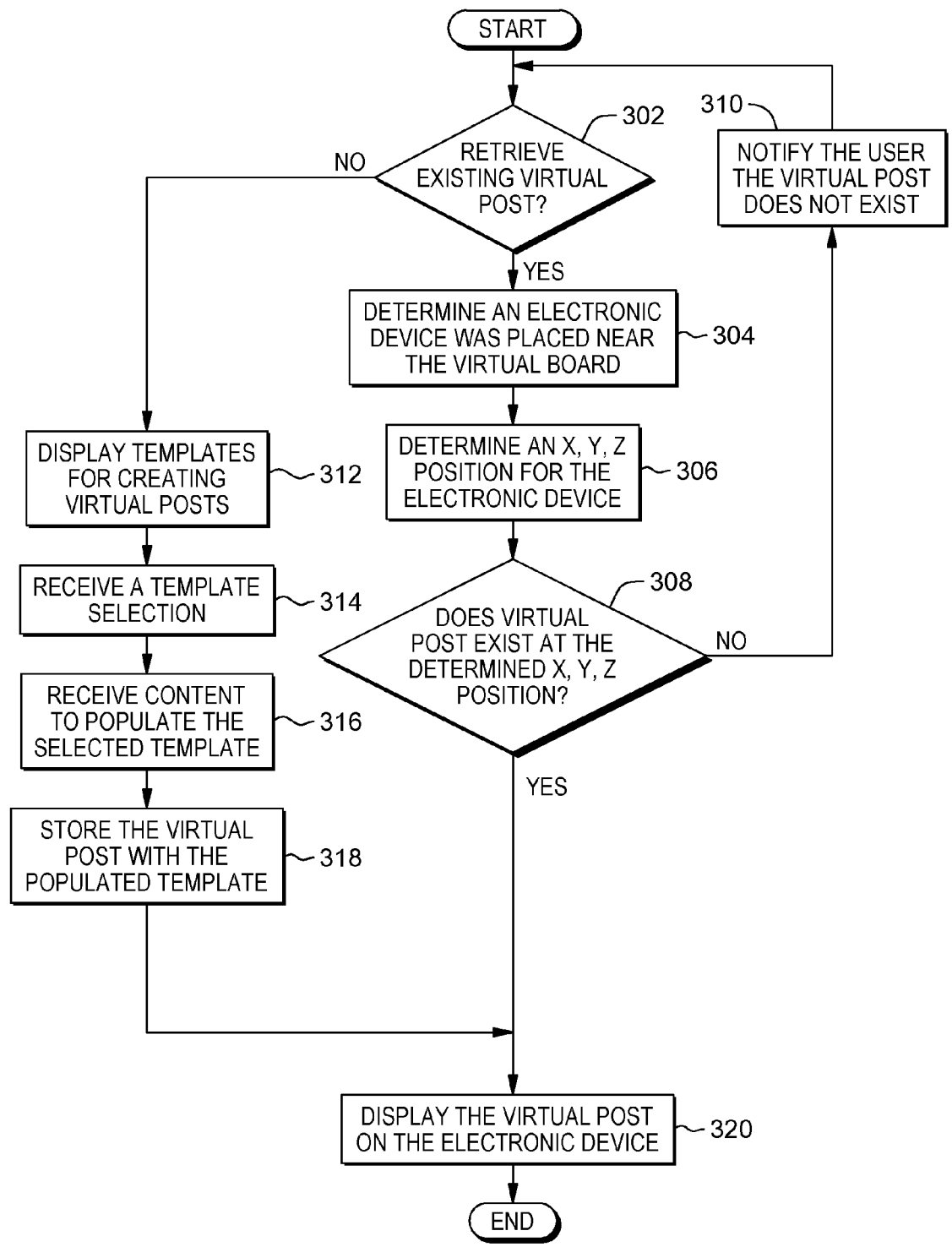
FIG. 3 is a flowchart depicting one embodiment of a content visualizer retrieving or creating a virtual post on a virtual board, in accordance with the present invention.

FIG. 3 is a flowchart depicting one embodiment of a content visualizer retrieving or creating a virtual post on a virtual board, in accordance with the present invention. As depicted, a method includes determining (302) whether to retrieve an existing post, determining (304) an electronic device was placed near the virtual board, determining (306) an X, Y, and Z position for the electronic device, determining (308) whether the virtual post exists at the determined X, Y, and Z position, notifying (310) the user the virtual post does not exist, displaying (312) templates for creating virtual posts, receiving (314) a template selection, receiving (316) content to populate the selected template, storing (318) the virtual post with the populated template, and displaying (320) the virtual post on the electronic device. In one embodiment, content visualizer 112 performs the above-mentioned steps of the method.

The method may commence by determining (302) whether to retrieve an existing post. In one embodiment, content visualizer 112 displays two options in user interface 118 on electronic device 104, retrieve an existing virtual post from the virtual board or create a new virtual post for the virtual board. The user participating in the collaboration event has the ability to select one of the two options in user interface 118 on electronic device 104. Content visualizer 112 receiving a user selection to retrieve an existing virtual post from the virtual board represents content visualizer program 112 determining to retrieve an existing virtual post ("yes" branch, 302). Content visualizer 112 receiving a user selection to create a new virtual post for the virtual board represents content visualizer 112 determining not to retrieve an exist virtual post ("no" branch, 302).

In the event content visualizer 112 determines to retrieve an existing virtual post ("yes" branch, 302), content visualizer 112 determines (304) an electronic device was placed near the virtual board. In the event content visualizer 112 determines not to retrieve an existing virtual post ("no" branch, 302), content visualizer 112 displays (312) templates for creating virtual posts.

The method may continue by determining (304) an electronic device was placed near the virtual board. In this embodiment, display apparatus 106 renders the virtual board and location provider 108 provides a location for electronic device 104 relative to the virtual board being rendered by display apparatus 106. Content visualizer 112 receives information from location provider 108 that electronic device 104 is in a vicinity of the virtual board. Vicinity can represent a location of electronic device 104 for which content visualizer 112 can determine an X, Y, and Z position for the electronic device relative to the virtual board. In another embodiment, content visualizer 112 determines that the electronic device from which content visualizer 112 receives a user selection to retrieve an existing virtual post from the virtual board is near location provider 108. However, location provider 108 is unable to determine complete coordinates for the electronic device relative to the virtual board and content visualizer 112 displays a message in user interface 118 on electronic device 104 notifying the user to place electronic device 104 near the virtual board.

The method may continue by determining (306) an X, Y, and Z position for the electronic device. In this embodiment, content visualizer 112 receives X, Y, and Z position coordinates for electronic device 104 relative to the virtual board. The placement of electronic device 104 relative to the virtual board represents a motion of a user placing a physical post on a physical board. The X position represents a longitudinal position and the Y position represents a latitudinal position for electronic device 104 relative to the virtual board. The Z position represents a depth position for electronic device 104 relative to the virtual board. In an example, a user of electronic device 104 is retrieving virtual post B located in the bottom left corner of the virtual board, where virtual post B is situated between virtual post A and virtual post C. Content visualizer 112 determines an X, Y, and Z position for electronic device as (−25, −35, 1), where the left position is represented by X=−25, the bottom position is represented by Y=−35, and virtual post B situated between virtual post A (i.e., Z=0) and virtual post C (i.e., Z=2) is represented by Z=1.

In another example, a user of electronic device 104 is retrieving virtual post C located in the top right corner of the virtual board, where virtual post C is situated on top of virtual post A and virtual post B. Content visualizer 112 determines an X, Y, and Z position for electronic device as (30, 30, 2), where the right position is represented by X=30, the top position is represented by Y=30, and virtual post C situated on top of virtual post A (i.e., Z=0) and virtual post B (i.e., Z=1) is represented by Z=2. The X position and Y position represent constant values relative to the virtual boards. However, the Z position represents a varying value relative to the virtual board, as well as, a number of virtual posts at a particular X and Y position.

The method may continue by determining (308) whether the virtual post exists at the determined X, Y, and Z position. Content visualizer 112 can provide a margin of error for a location of a virtual post. Each virtual post can include retrieval vicinity, where the retrieval vicinity is a +/−3, X or Y position relative to the center of each virtual post. In one example, a first virtual post is located at the (20, 20, 0) position on a virtual board and electronic device 104 is placed at the (18, 19, 0) position on the virtual board. Content visualizer 112 determines that electronic device 104 is located within the vicinity of the first virtual post and determines that the user of electronic device 104 is retrieving the first virtual post. In a second example, a second virtual post is located at the (40, 50, 0) position on the virtual board and electronic device 104 is placed at the (36, 50, 0) position on the virtual board. Content visualizer 112 determines that electronic device 104 is located outside the vicinity of the second virtual post and determines that user of electronic device 104 is not retrieving the second virtual post.

In the event content visualizer 112 determines the virtual post does not exist at the determined X, Y, and Z position ("no" branch, 308), content visualizer 112 notifies (310) the user the virtual post does not exist. In the event content visualizer 112 determines a virtual post exists at the determined X, Y, and Z position ("yes" branch, 308), content visualizer 112 displays (320) the virtual post on the electronic device. In an embodiment, where multiple virtual posts exist at the determined X, Y, and Z position, content visualizer 112 can display the multiple virtual posts on electronic device 104 and prompt the user of electronic device 104 to select the correct virtual post out of the multiple virtual posts to retrieve.

The method may continue by notifying (310) the user the virtual post does not exist. In this embodiment, content visualizer 112 sends a notification to electronic device 104 that a virtual post was not retrieved because a virtual position does not exist at the determined X, Y, and Z position on the virtual board. Content visualizer 112 reverts back to determining (302) whether to retrieve a virtual post, where a user can select whether to try and retrieve the virtual post from the virtual board again or create a new virtual post for the virtual board.

The method may continue by displaying (312) templates for creating virtual posts. In this embodiment, content visualizer 112 displays multiple templates for creating a virtual post in user interface 118 on electronic device 104. Each of the multiple templates can include unique stylistic features including but not limited to background types, background colors, font style, font size, font color, and virtual post sizes. Each of the multiple templates is customizable by the user of electronic device 104. For example, content visualizer 112 allows for the user of electronic device 104 to create, alter, and store particular features of a template based on user preference. A particular feature can include a unique signature specific to the user creating the new virtual post. Content visualizer 112 can organize the templates for creating virtual posts according to categories including but not limited to comments, question, answer, web browser, image, video, and computer program, where a user interface of a particular program is displayed in the virtual post.

The method may continue by receiving (314) a template selection. In this embodiment, content visualizer 112 receives a template selection for creating a virtual post through user interface 118 on electronic device 104.

The method may continue by receiving (316) content to populate the selected template. In this embodiment, content visualizer 112 receives content to populate the selected template in the form of a written statement. Content visualizer 112 receives the written statement via a user input on a keyboard located on electronic device 104. In another embodiment, content visualizer 112 receives a website address, where a webpage associated with the received website address represents the content to populate the selected template. Content visualizer 112 receives a website address via a user input on a keyboard located on electronic device 104, accesses a webpage associated with the website address, formats the content of the webpage, and populates the selected template with the formatted content of the webpage.

The method may continue by storing (318) the virtual post with the populated template. In this embodiment, content visualizer 112 stores the virtual post with the populated template in a portion of storage designated to the user associated with the creation of the virtual post. Content visualizer 112 associates the virtual post with the populated template with the collaboration event for which the virtual post was created. Content visualizer 112 can provide a list of virtual posts to the user of electronic device 104 that exist but have yet to be posted to the virtual board during the collaboration event. For example, the list of virtual posts can include virtual posts retrieved from a virtual board by a user of electronic device 104 but have not yet been deleted or virtual posts created by the user of electronic device 104 but have yet to be posted to the virtual board.

The method may continue by displaying (320) the virtual post on the electronic device. In one embodiment, content visualizer 112 displays a virtual post retrieved from the virtual board on electronic device 104. In a second embodiment, content visualizer displays a newly created virtual post on the electronic device 104. Content visualizer 112 allows for the user of electronic device 104 to edit and store the retrieved or newly created virtual post in a local storage on electronic device 104. Content visualizer 112 also allows the for the user of electronic device to delete a virtual post being displayed on electronic device 104 or post a virtual post being displayed on electric device 104. Further implementation of deleting or posting virtual posts is discussed in further detail in FIG. 4.

Figure 4:
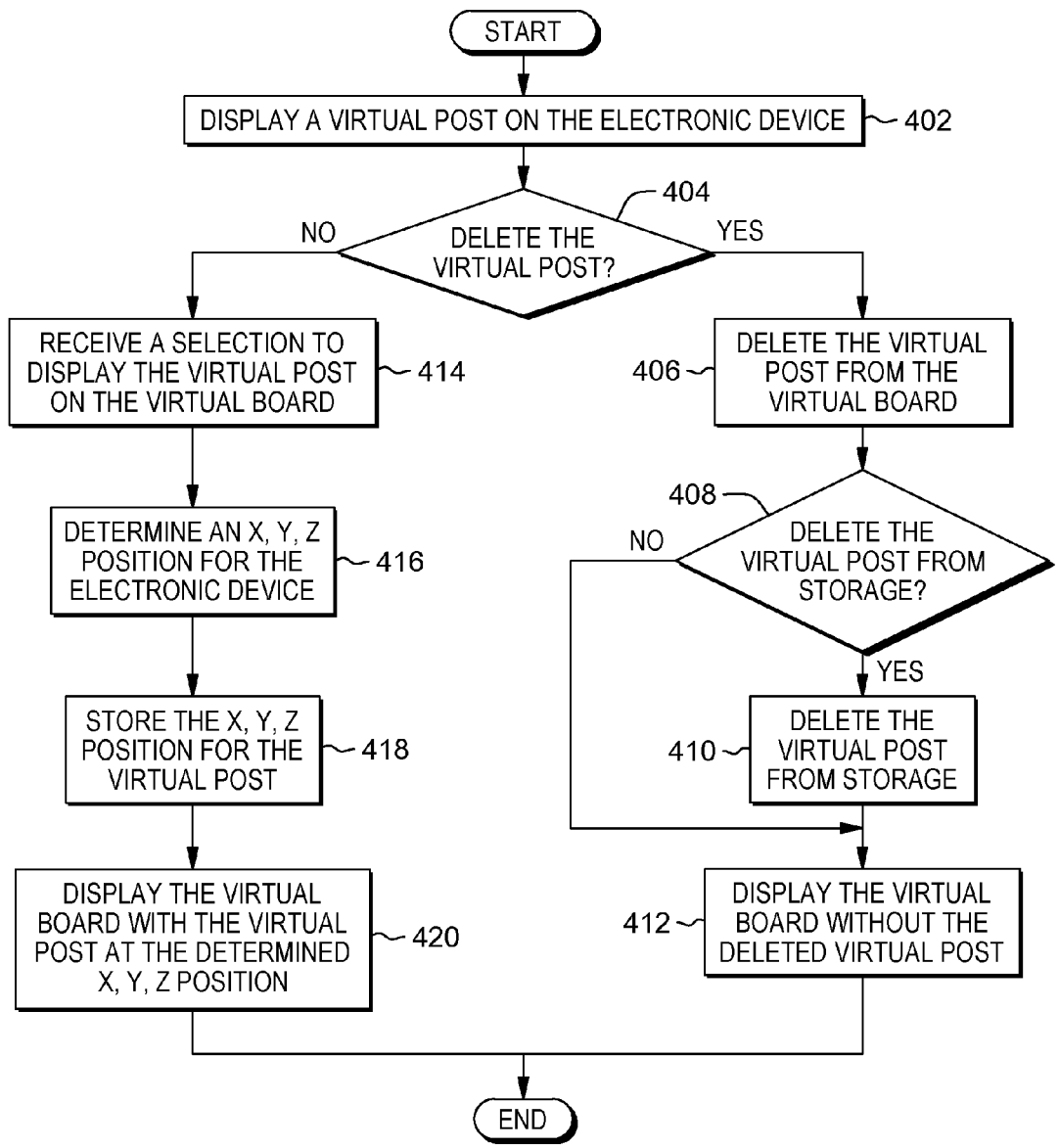
FIG. 4 is a flowchart depicting one embodiment of a content visualizer posting or deleting a virtual post on a virtual board, in accordance with the present invention.

FIG. 4 is a flowchart depicting one embodiment of a content visualizer posting or deleting a virtual post on a virtual board, in accordance with the present invention. As depicted, a method includes displaying (402) a virtual post on the electronic device, determining (404) whether to delete the virtual post, deleting (406) the virtual post from the virtual board, determining (408) whether to delete the virtual post from storage, deleting (410) the virtual post from storage, displaying (412) the virtual board without the deleted virtual post, receiving (414) a selection to display the virtual post on the virtual board, determining (416) an X, Y, and Z position for the electronic device, storing (418) the X, Y, and Z position for the virtual post, and displaying (420) the virtual board with the virtual post at the determined X, Y, and Z position. In one embodiment, content visualizer 112 performs the above-mentioned steps of the method.

The method may commence by displaying (402) a virtual post on the electronic device. In this embodiment, content visualizer 112 displays a virtual post populated with content in user interface 118 on electronic device 104. Content visualizer 112 can also display the virtual post displayed on electronic device 104, on a virtual board during a collaboration event. A user of electronic device 104 has the ability to edit the virtual post populated with content and content visualizer 112 can store any edits performed to the virtual post by the user of electronic device 104. In one embodiment, subsequent to storing any edits performed to the virtual post on electronic device 104, content visualizer 112 has the ability to perform the edits to the virtual post being displayed on the virtual board. In another embodiment, content visualizer 112 has the ability to perform edits to the virtual post on the virtual board in parallel with edits being inputted by a user of electronic device 104.

The method may continue by determining (404) whether to delete the virtual post. In this embodiment, content visualizer 112 displays two options in user interface 118 on electronic device 104, delete an existing virtual post from the virtual board or display a virtual post on the virtual board. The user participating in the collaboration event has the ability to select one of the two options in user interface 118 on electronic device 104. In another embodiment, content visualizer 112 determines whether to delete the virtual post by receiving a user supplied gesture through electronic device 104. For example, the user of electronic device 104 performs a gesture of rapidly moving electronic device 104 in a side-to-side motion to delete the virtual post. Content visualizer 112 receives the gesture information of the user moving electronic device 104 in the side-to-side motion and determines to delete the virtual post.

Content visualizer 112 receiving a user selection to delete the exist virtual post from the virtual board represents content visualizer program 112 determining to delete the virtual post ("yes" branch, 404). Content visualizer 112 receiving a user selection to display the virtual post on the virtual board represents content visualizer 112 determining not to delete the virtual post ("no" branch, 404).

In the event content visualizer 112 determines to delete the virtual post ("yes" branch, 404), content visualizer 112 deletes (406) the virtual post from the virtual board. In the event content visualizer 112 determines not to delete the virtual post ("no" branch, 406), content visualizer 112 receives (414) a selection to display the virtual post on the virtual board.

The method may continue by deleting (406) the virtual post from the virtual board. In this embodiment, content visualizer 112 deletes the virtual post from the virtual board by displaying the virtual post as a transparent overlay for a specified period of time (e.g., 30 seconds). During this specified period of time, a user of electronic device 104 has the ability to restore the virtual post by placing electronic device 104 at the X, Y, and Z position where content visualizer 112 displays the virtual post as the transparent overlay. Content visualizer 112 determines that a transparent overlay of a virtual post exists at the X, Y, and Z position where electronic device 104 was placed and displays the virtual post in the virtual board, but no longer as a transparent overlay.

The method may continue by determining (408) whether to delete the virtual post from storage. In this embodiment, content visualizer 112 displays an option in user interface 118 on electronic device 104, to delete the virtual post from storage. In the event content visualizer 112 determines to delete the virtual post from storage ("yes" branch, 408), content visualizer 112 deletes (410) the virtual post from storage. In the event content visualizer 112 determines not to delete the virtual post from storage ("no" branch, 408), content visualizer 112 displays (412) the virtual board without the deleted virtual post.

The method may continue by deleting (410) the virtual post from storage. In this embodiment, content visualizer 112 deletes the virtual post from a portion of storage designated to the user hosting the collaboration event. The portion of storage designated to the user hosting the collaboration event includes a list of collaboration events, a list of virtual boards for each collaboration event, and a list of virtual posts for each virtual board. In this embodiment, any participating user in a particular collaboration event has the ability to delete a virtual post from a virtual board. Since content visualizer 112 associates each virtual post with a particular virtual board in a particular collaboration event, content visualizer 112 removes the virtual post from the list of virtual posts assigned to the particular virtual board in the particular collaboration event.

The method may continue by displaying (412) the virtual board without the deleted virtual post. In this embodiment, the deleted virtual post was one of three virtual posts at a particular X, Y, and Z position on the virtual board. As a result, content visualizer 112 removes the deleted virtual post and adjusts the Z position coordinate for the other two virtual posts accordingly. For example, if the deleted virtual post (i.e., virtual post A) was situated under virtual post B and virtual post C, content visualizer 112 alters the Z position coordinate for virtual post B from Z=1 to Z=0 and alters the Z position coordinate for virtual post C from Z=2 to Z=1. In another embodiment, where the virtual post is displayed as a transparent overlay subsequent to deletion, content visualizer 112 removes the virtual post displayed as a transparent overlay from the virtual board.

The method may continue by receiving (414) a selection to display the virtual post on the virtual board. In this embodiment, content visualizer 112 receives a user selection to display the virtual post on the virtual board via user interface 118 on electronic device 104. In the event there are multiple virtual boards being utilized for the collaboration event, content visualizer 112 can receive a selection specifying which virtual board to display the virtual post. Alternatively, the user of electronic device 104 can approach a particular virtual board out of the multiple virtual boards being utilized for the collaboration event and content visualizer 112 can receive information from location provider 108 specifying which virtual board was approached by the user of electronic device 104.

The method may continue by determining (416) an X, Y, and Z position for the electronic device. In this embodiment, the user of electronic device 104 approaches the virtual board being rendered by display apparatus 106. Location provider 108 determines that electronic device 104 is placed within the vicinity of the virtual board. Vicinity can represent a location of electronic device 104 for which content visualizer 112 can determine an X, Y, and Z position for the electronic device relative to the virtual board. Content visualizer 112 can render the virtual post as a transparent overlay on the virtual board and the transparent overlay can mimic the motion of electronic device 104 as the user moves electronic device 104 into position on the virtual board. If a first virtual post exists at the same location where electronic device 104 is positioned to post a second virtual post, the user can position electronic device 104 closer or further to the virtual board to represent whether to position the second virtual post on top of or beneath the first virtual post.

Content visualizer 112 determines an X, Y, and Z position of electronic device 104 by receiving a user input that electronic device 104 is in position, querying location provider 108 for the X, Y, and Z position, and receiving the X, Y, and Z position for electronic device 104. An example of a user input that electronic device 104 is in position includes the user of electronic device 104 pitching the top portion of electronic device 104 forward towards the virtual board, such that action controller 116 registers the gesture information and sends the gesture information to content visualizer 112. Content visualizer 112 receives the gesture information and determines that electronic device 104 is in position for obtaining X, Y, and Z position coordinates. Another example of a user input that electronic device 104 is in position includes the user of electronic device 104 double tapping the screen on which user interface 118 is displayed.

The method may continue by storing (418) the X, Y, and Z position for the virtual post. In this embodiment, subsequent to receiving X, Y, and Z position coordinates for the virtual post from location provider 108, content visualizer 112 stores the X, Y, and Z position for the virtual post in the portion of storage designated to the user hosting the collaboration event. Content visualizer 112 stores the X, Y, and Z position in the portion of storage designated to the user hosting the collaboration event under a particular virtual post from a list of virtual post, where the particular virtual post is associated with a particular virtual board from a list of virtual boards associated to a particular collaboration event from a list of collaboration events.

The method may continue by displaying (420) the virtual board with the virtual post at the determined X, Y, and Z position. In this embodiment, content visualizer 112 displays the virtual board with the virtual post (i.e., virtual post C) at the determined X, Y, and Z position, where virtual post A and virtual post B also exist at the determined X, Y, and Z position. Virtual post C was positioned under virtual post A and virtual post B and as a result, content visualizer 112 adjusts the Z position coordinate for virtual post A and virtual post B accordingly. Since virtual post C was situated under virtual post A and virtual post B, content visualizer 112 alters the Z position coordinate for virtual post A from Z=0 to Z=1 and alters the Z position coordinate for virtual post B from Z=1 to Z=2. Content visualizer 112 stores the adjusted X, Y, and Z position coordinates for virtual post A and virtual post B.

FIG. 5A illustrates an example scenario for displaying a virtual board populated with virtual posts, in accordance with the present invention. In this example scenario, content visualizer 112 utilizes display apparatus 504 to render virtual board 502. A location provider utilizes locator 506A, 506B, 506C, and 506D to identify a position for any electronic device brought within a vicinity of virtual board 502, where vicinity represents a location of electronic device for which content visualizer 112 can determine an X, Y, and Z position for the electronic device relative to virtual board 502. Virtual posts 508, 510, and 512 represent existing virtual posts previously created during a collaboration event. Virtual post 512 represents a virtual post being retrieved from virtual board 502 and is discussed in further detail in FIG. 5B. Virtual post 514 represents display apparatus 504 rendering a virtual post as a transparent overlay for a specified period of time, for example, equal to 30 seconds. Virtual post 514 is discussed in further detail in FIG. 5C.

FIG. 5B illustrates an example scenario for retrieving or creating a virtual post on the virtual board from FIG. 5A, in accordance with the present invention. In this example, a user of electronic device 516 is retrieving virtual post 512 from virtual board 502 of FIG. 5A. A user of electronic device 516 approaches virtual board 502, content visualizer 112 receives a selection to retrieve a virtual post via user input on a provided retrieve selection 518 option on electronic device 516, and the location provider obtains an X, Y, and Z position for electronic device 516 via locator 506A, 506B, 506C, and 506D. Content visualizer 112 receives the X, Y, and Z position from the location provider and determines virtual post 512 exists at the determined X, Y, and Z position. Content visualizer 112 displays virtual post 512 in the user interface of electronic device 516, where the user of electronic device 516 can edit or local store virtual post 512 on electronic device 516. Content visualizer 112 also provides a create virtual post selection 520 option on electronic device 516, where content visualizer 112 can receive a selection to create a new virtual post for virtual board 502 via user input on the provided create virtual post selection 510 option.

FIG. 5C illustrates an example scenario for posting or deleting a virtual post on the virtual board from FIG. 5A, in accordance with the present invention. In this example scenario, a user of electronic device 516 is deleting virtual post 514 from virtual board 502 of FIG. 5A. The dotted boarder for virtual post 514 represents the transparent rendering of virtual post 514 by display apparatus 504. A user of electronic device 516 approaches virtual board 502, content visualizer 112 receives a user input that electronic device 516 is in position, and the location provider obtains an X, Y, and Z position for electronic device 516 via locator 506A, 506B, 506C, and 506D. Content visualizer 112 receives the X, Y, and Z position from the location provider and determines virtual post 514 exists at the determined X, Y, and Z position. Content visualizer 112 displays virtual post 514 in the user interface of electronic device 516, where the user of electronic device 516 can edit or delete virtual post 514 from virtual board 502.

Content visualizer 112 provides a delete virtual post selection 522 for deleting virtual posts from virtual board 502, where in this example scenario virtual post 514 is being deleted from virtual board 502. Content visualizer 112 can also receive edits to virtual post 514 and post an edited virtual post 514 at the determined X, Y, and Z position on virtual board 502 via a user input on post selection 524. Alternatively, content visualizer 112 can post an edited virtual post 514 at a newly determined X, Y, and Z position based on a new location of electronic device 516.

Figure 6:
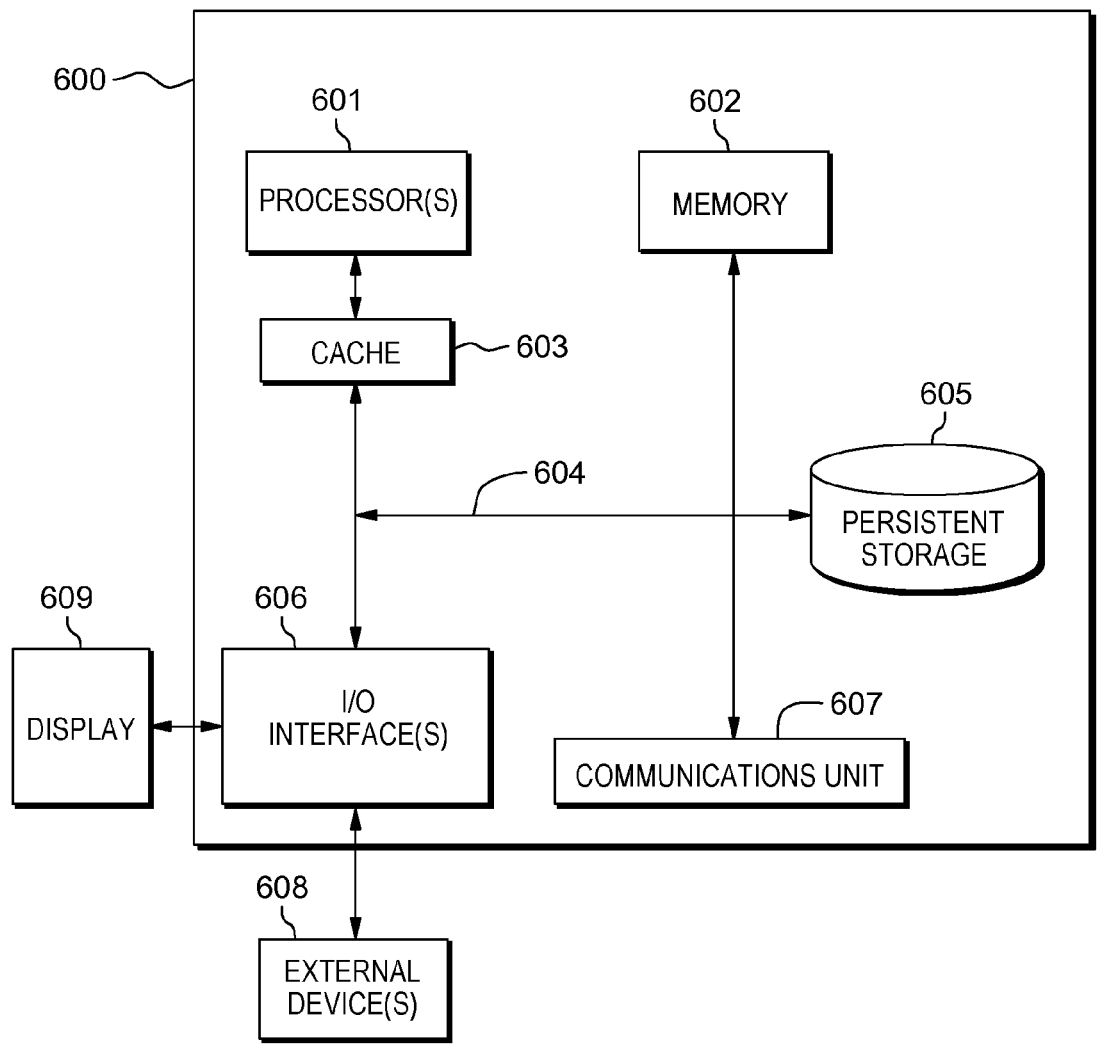
FIG. 6 is a block diagram of components of a computer system, such as the computer server of FIG. 1, in an embodiment in accordance with the present invention.

FIG. 6 depicts computer system 600, where server computer 102 and electronic device 104 are each an example of a system that includes content visualizer 112. The computer system includes processors 601, cache 603, memory 602, persistent storage 605, communications unit 607, input/output (I/O) interface(s) 606 and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention may be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface 606 may provide a connection to external devices 608 such as a keyboard, keypad, a touch screen, and/or some other suitable input device. External devices 608 can also include portable computer readable storage media such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, a first virtual board selection from a first user, wherein a first virtual board allows for one or more users to create one or more virtual posts during a current collaboration event;
   displaying, by one or more processors, the first virtual board and a first set of previously created virtual posts in the first virtual board, wherein the first set of previously created virtual posts is associated with a previous collaboration event;

displaying, by one or more processors, two or more templates for creating a new virtual post;

responsive to receiving a first template selection for creating the new virtual post, receiving, by one or more processors, content to populate the first template, wherein the populated first template represents a first virtual post of a second set of virtual posts for the current collaboration event; and displaying, by one or more processors, the first virtual post on the first virtual board based on a first position of an electronic device associated with the first user relative to the first virtual board.

2. The method of claim 1, further comprising:

determining, by one or more processors, whether the electronic device was placed in a vicinity of the first virtual board, wherein the vicinity allows for at least a partial position determination for the electronic device;

determining, by one or more processors, a second position for the electronic device; and responsive to determining a second virtual post exists at the second position, displaying, by one or more processors, the second virtual post on the electronic device.

3. The method of claim 2, further comprising:

determining, by one or more processors, whether to delete the second virtual post from the first virtual board based on a user input on the electronic device, wherein a user input includes a gesture performed with electronic device; and deleting, by one or more processors, the second virtual post from the first virtual board.

4. The method of claim 1, further comprising:

storing, by one or more processors, the populated first template as the first virtual post of the second set of virtual posts for the current collaboration event; and displaying, by one or more processors, the first virtual post on the electronic device.

5. The method of claim 4, wherein displaying, by one or more processors, the first virtual post on the first virtual board comprises:

determining, by one or more processors, the first position for the electronic device;

storing, by one or more processors, the first position as a location for the first virtual post on the first virtual board; and sending, by one or more processors, first position information and the first virtual post to a display apparatus.

6. The method of claim 3, further comprising:

determining, by one or more processors, a third position of a third virtual post is associated with the second position of the second virtual post; and responsive to determining the second virtual has been deleted from the first virtual board, assigning, by one or more processors, the second position to the third virtual post.

7. The method of claim 3, further comprising:

displaying, by one or more processors, the second virtual post as a transparent overlay on the first virtual board for a specified period of time.

8. A computer program product comprising:

one or more computer readable tangible storage media and program instructions stored on at least one of the one or more storage media, the program instructions comprising:

program instructions to receive a first virtual board selection from a first user, wherein a first virtual board allows for one or more users to create one or more virtual posts during a current collaboration event;

program instructions to display the first virtual board and a first set of previously created virtual posts in the first virtual board, wherein the first set of previously created virtual posts is associated with a previous collaboration event;

program instructions to display two or more templates for creating a new virtual post;

program instructions to, responsive to receiving a first template selection for creating the new virtual post, receive content to populate the first template, wherein the populated first template represents a first virtual post of a second set of virtual posts for the current collaboration event; and program instructions to display the first virtual post on the first virtual board based on a first position of an electronic device associated with the first user relative to the first virtual board.

9. The computer program product of claim 8, further comprising program instructions, stored on the one or more computer readable storage media, which when executed by a processor, cause the processor to:

determine whether the electronic device was placed in a vicinity of the first virtual board, wherein the vicinity allows for at least a partial position determination for the electronic device;

determine a second position for the electronic device; and responsive to determining a second virtual post exists at the second position, display the second virtual post on the electronic device.

10. The computer program product of claim 9, further comprising program instructions, stored on the one or more computer readable storage media, which when executed by a processor, cause the processor to:

determine whether to delete the second virtual post from the first virtual board based on a user input on the electronic device, wherein a user input includes a gesture performed with electronic device; and delete the second virtual post from the first virtual board.

11. The computer program product of claim 8, further comprising program instructions, stored on the one or more computer readable storage media, which when executed by a processor, cause the processor to:

store the populated first template as the first virtual post of the second set of virtual posts for the current collaboration event; and display the first virtual post on the electronic device.

12. The computer program product of claim 11, wherein displaying, by one or more processors, the first virtual post on the first virtual board comprises program instructions, stored on the one or more computer readable storage media, which when executed by a processor, cause the processor to:

determine the first position for the electronic device;

store the first position as a location for the first virtual post on the first virtual board; and send first position information and the first virtual post to a display apparatus.

13. The computer program product of claim 10, further comprising program instructions, stored on the one or more computer readable storage media, which when executed by a processor, cause the processor to:

determine a third position of a third virtual post is associated with the second position of the second virtual post; and responsive to determining the second virtual has been deleted from the first virtual board, assign the second position to the third virtual post.

14. The computer program product of claim 10, further comprising program instructions, stored on the one or more computer readable storage media, which when executed by a processor, cause the processor to:

display the second virtual post as a transparent overlay on the first virtual board for a specified period of time.

15. A computer system comprising:

one or more computer processors;

one or more computer readable storage media; and program instructions stored on the computer readable storage media for execution by at least one of the one or more computer processors, the program instructions comprising:

program instructions to receive a first virtual board selection from a first user, wherein a first virtual board allows for one or more users to create one or more virtual posts during a current collaboration event;

program instructions to display the first virtual board and a first set of previously created virtual posts in the first virtual board, wherein the first set of previously created virtual posts is associated with a previous collaboration event;

program instructions to display two or more templates for creating a new virtual post;

program instructions to, responsive to receiving a first template selection for creating the new virtual post, receive content to populate the first template, wherein the populated first template represents a first virtual post of a second set of virtual posts for the current collaboration event; and program instructions to display the first virtual post on the first virtual board based on a first position of an electronic device associated with the first user relative to the first virtual board.

16. The computer system of claim 15, further comprising program instructions, stored on the one or more computer readable storage media, which when executed by a processor, cause the processor to:

determine whether the electronic device was placed in a vicinity of the first virtual board, wherein the vicinity allows for at least a partial position determination for the electronic device;

determine a second position for the electronic device; and responsive to determining a second virtual post exists at the second position, display the second virtual post on the electronic device.

17. The computer system of claim 16, further comprising program instructions, stored on the one or more computer readable storage media, which when executed by a processor, cause the processor to:

determine whether to delete the second virtual post from the first virtual board based on a user input on the electronic device, wherein a user input includes a gesture performed with electronic device; and delete the second virtual post from the first virtual board.

18. The computer system of claim 15, further comprising program instructions, stored on the one or more computer readable storage media, which when executed by a processor, cause the processor to:

store the populated first template as the first virtual post of the second set of virtual posts for the current collaboration event; and display the first virtual post on the electronic device.

19. The computer system of claim 18, wherein displaying, by one or more processors, the first virtual post on the first virtual board comprises program instructions, stored on the one or more computer readable storage media, which when executed by a processor, cause the processor to:

determine the first position for the electronic device;

store the first position as a location for the first virtual post on the first virtual board; and send first position information and the first virtual post to a display apparatus.

20. The computer system of claim 17, further comprising program instructions, stored on the one or more computer readable storage media, which when executed by a processor, cause the processor to:

determine a third position of a third virtual post is associated with the second position of the second virtual post; and responsive to determining the second virtual has been deleted from the first virtual board, assign the second position to the third virtual post.

* * * * *